Apr. 24, 1923.

J. ROWE 1,452,985

STEERING GEAR STOP DEVICE

Filed May 25, 1920

INVENTOR:
JOHN ROWE
By
Earl M. Sinclair
Atty.

Patented Apr. 24, 1923.

1,452,985

UNITED STATES PATENT OFFICE.

JOHN ROWE, OF CASEY, IOWA.

STEERING-GEAR STOP DEVICE.

Application filed May 25, 1920. Serial No. 384,195.

*To all whom it may concern:*

Be it known that I, JOHN ROWE, a citizen of the United States of America, and resident of Casey, Guthrie County, Iowa, have invented a new and useful Steering-Gear Stop Device, of which the following is a specification.

The object of this invention is to provide an improved attachment for a well known make of automobile to limit movement of the steering arm when the steering wheel is turned in either direction.

A further object of this invention is to provide an improved stop device adapted to be attached to the frame of a certain type of automobile in such manner as to limit swinging movement of the steering arm in either direction and thereby limit pivotal movement of the steering knuckles and prevent undue or abnormal turning of the steering wheels.

My invention consists in the construction, arrangement and combination of elements hereinafter set forth, pointed out in my claims and illustrated by the accompanying drawing, in which—

Figure 1:
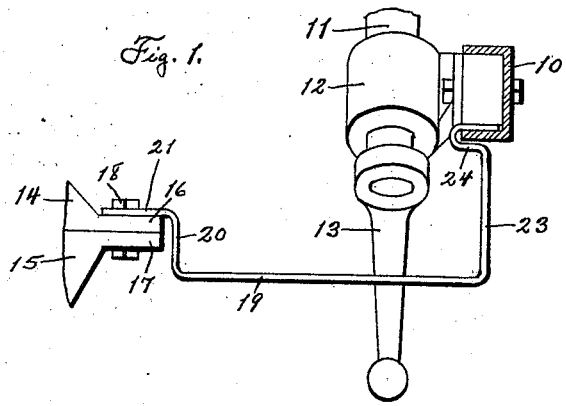
Figure 2:
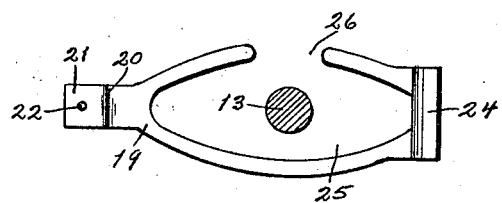
Figure 3:
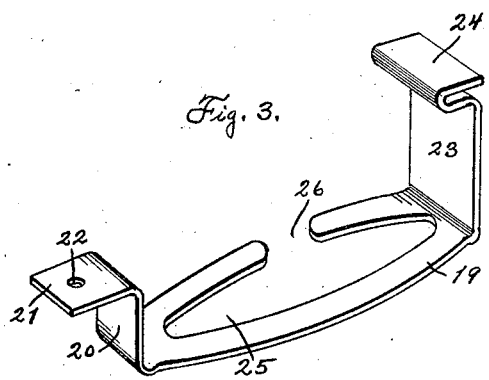

Figure 1 is a front elevation partly in section illustrating my improved attachment in position for practical use. Figure 2 is a plan of the device detached, the steering-gear arm being shown in section in its proper relation to the device. Figure 3 is a perspective of the device detached.

The numeral 10 designates one of the channel side frame bars of a motor vehicle, adjacent to which frame bar is a steering post 11 journaled at its lower end in a bearing 12 carried by said frame bar. Secured to the lower end of the steering post 11 is the steering gear ball arm 13, adapted for swinging movement when the steering post is rotated to communicate reciprocal motion to a transversely arranged steering rod secured to its lower end and suitably connected to the steering knuckles of the vehicle in a common and well known manner. The numeral 14 designates a fragment of a cylinder block located centrally of the vehicle frame and over-lying the crank-case 15, said cylinder block and crank-case being formed with horizontal flanges 16, 17 adapted to be secured together by a series of bolts 18.

My attachment comprises a plate 19 adapted to be arranged in horizontal position between the engine and the side frame bar 10 and suitably secured to said members. In this instance I have shown the plate 19 formed at its inner end with an integral upstanding arm 20 terminating in a lip 21 adapted to over-lie and be supported by the flange 16 of the cylinder block and said lip preferably is formed with a hole 22 adapted to receive one of the bolts 18. At the outer end the plate 19 is formed with an integral upstanding arm 23 of greater length than the arm 20 and terminating at its upper end in an outwardly directed hook 24 adapted to engage a horizontal flange of the frame member 10. The plate 19 is formed with a longitudinal slot or opening 25 and preferably is widened between its ends so that said slot or opening may be of generally elliptical form in order not to interfere with proper swinging movement of the steering-gear arm 13. The slot or opening 25 is designed to embrace and receive a steering-gear arm 13 as shown in Figures 1 and 2, and lateral swinging movement of said arm is effectively limited by engagement with the plate 19 at the ends of said slot and through the use of this device abnormal lateral movement of the steering-gear arm 13 is prevented, thereby preventing undue and undesirable pivotal movement of the steering knuckles and steering wheels of the vehicle, which often results in accident and injury to the vehicle, its occupants or pedestrians. The plate 19 preferably is formed at one side and between its ends with a notch or opening 26 leading from its outer margin to the slot 25, said notch or opening being of sufficient length to permit passage of the arm 13, thus facilitating the attachment and removal of the device relative to the vehicle.

The means shown and described for attaching the device are believed to be sufficient to hold it securely in place but if desired positive means may be employed for securing the outer end of the plate to the frame of the vehicle.

It is obvious that this attachment may be made in one piece, will be cheap and economical to manufacture and will be very easily attached; also that it will not interfere with proper steering operation of the vehicle and will effectively overcome one of the draw-backs of those vehicles equipped with the direct type of steering mechanism.

I claim as my invention—

1. In a device of the class described, the combination with the frame and steering-gear arm of an automobile, of a plate arranged in horizontal position and attached to said frame, said plate being formed with a slot adapted to receive and limit movement of said steering-gear arm, said plate being formed with a notch opening from one of its margins to said slot.

2. As an article of manufacture, a steering-gear stop device comprising a plate formed with integral upstanding arms at its opposite ends, means for attaching said arms at their upper ends to a vehicle, said plate being formed with a slot adapted to receive a steering-gear arm, whereby movement of said arm is limited by contact with said plate at either end of said slot, said plate being formed with a notch opening from one of its margins to said slot.

Signed at Casey, in the county of Guthrie and State of Iowa, this 19th day of May, 1920.

JOHN ROWE.